United States Patent [19]
Madison, II

[11] 3,881,814
[45] May 6, 1975

[54] SLIDE ORIENTING DEVICE
[76] Inventor: Frank J. Madison, II, R.D. 1, Box 285, Trafford, Pa.
[22] Filed: June 12, 1972
[21] Appl. No.: 261,625

[52] U.S. Cl. .................. 353/95; 353/103; 353/122
[51] Int. Cl. ... G03b 1/48; G03b 23/00; G03b 23/14
[58] Field of Search ....... 353/30, 95, 103, 116, 117, 353/122

[56] References Cited
UNITED STATES PATENTS
| | | | |
|---|---|---|---|
| 2,597,449 | 5/1962 | Cassidy | 353/103 |
| 2,953,966 | 9/1960 | Leitz | 353/103 |
| 3,036,496 | 5/1962 | Frederick | 353/30 |

Primary Examiner—Richard E. Aegerter
Assistant Examiner—A. J. Mirabito
Attorney, Agent, or Firm—Stein & Orman

[57] ABSTRACT

A slide orienting device for orienting slide transparencies comprising a rotatably mounted slide support bracket configured to support a slide transparency and a fixed slide retainer means which cooperatively engage the slide transparency in axial alignment with the lens and light source of the slide projection. The device further includes a rotation means to rotate the slide support bracket relative to the slide projector to selectively orient the slide and a plurality of slots formed about the periphery of the support bracket to unload the slide transparencies notwithstanding the support bracket orientation.

12 Claims, 8 Drawing Figures

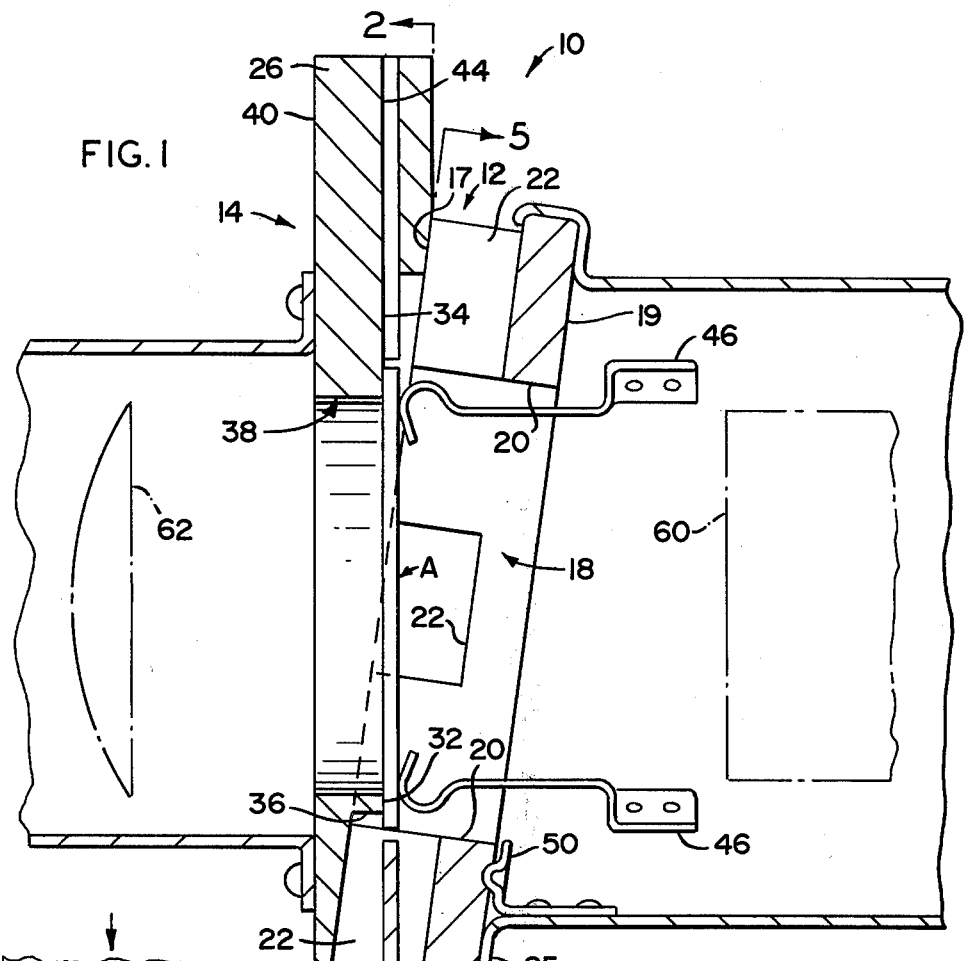
FIG.1
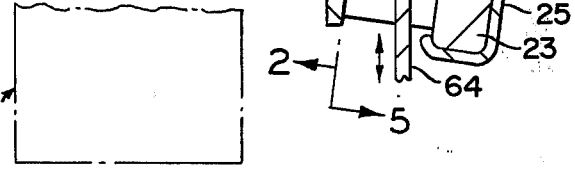
FIG.2
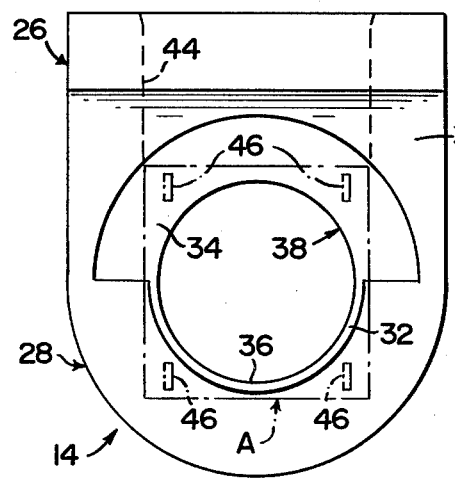
FIG.3
FIG.4
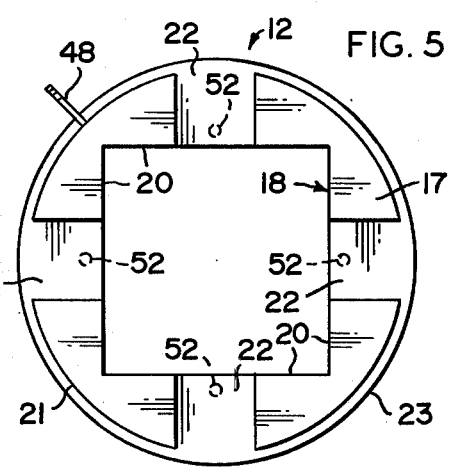
FIG.5
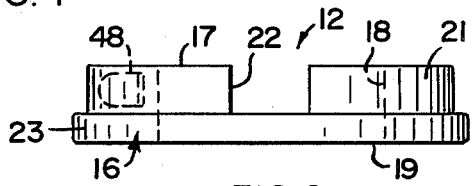
FIG.6

SLIDE ORIENTING DEVICE

BACKGROUND OF THE INVENTION

1. Field of the Invention

This invention relates to a slide orienting device comprising slide retaining bracket rotatably mounted on a slide projector and a retainer means arranged relative to each other to cooperatively engage a slide transparency for viewing wherein the slide retaining bracket and slide transparencies are rotatably reoriented relative to the slide projector.

2. Description of the Prior Art

As the popularity of home photography has increased, the demand for new and improved photographic equipment and accessories has expanded greatly. An area of particularly immense growth has been the increased popularity in slide transparencies, slide projectors and slide changers. The use of slide transparencies as educational and promotional aids has further enhanced the demand for improved slide projectors.

The earliest slide projectors included bracket means where the individual slides were inserted and withdrawn singly. Later projectors incorporated reciprocating bracket means to permit side-by-side coplanar mounting of several slides. In operation, the slide on one side was viewed while replacing the slide on the other side, and vice versa. This type of projector was slow and the excessive handling of the slides exposed them to unnecessary wear and deterioration.

Later projectors included elongated magazines retaining the slides in longitudinal alignment so that the slides could be advanced serially into the viewing position. To increase the viewing and changing speed, these later devices generally had complicated, elaborate feeding and retracting mechanisms. In addition to the increased cost of manufacturing, these devices are often the subject of costly repairs due to their complex structure.

Rotary or carrousel-type trays with simplified feed and retract mechanisms has since been developed to overcome many of the previous shortcomings. Specifically, these mechanisms combine relative simplicity of structure with rapid handling speed. Unfortunately, even the most advanced projectors have the problem of proper slide orientation. Unless each slide is previewed, there is no assurance that the slide will be in the upright position. A number of the projectors include means of previewing the slides whereby the individual slide may be removed manually and reoriented. However, this is both tedious and time consuming. Thus, a need exists for a relatively inexpensive, durable device capable of automatically reorienting the slides without the necessity of removing the slide from the tray or bracket.

SUMMARY OF THE INVENTION

This invention relates to a slide oriented device for use with a transparency slide projector. More specifically, the slide orienting device comprises a rotatably mounted slide support bracket means and a fixed slide retainer means.

The rotatably mounted slide support bracket means comprises a base having a centrally disposed aperture formed therein. Extending inwardly from the periphery of the base and terminating at the centrally disposed aperture is a plurality of spaced rejecting passages interrupting the interior recess wall of the aperture.

The fixed side retainer means comprises an upper substantially rectangular portion and a lower substantially elliptical portion including an inclined surface. An annular slide retaining surface is cooperatively formed by a hemispheric recess and a hemispheric raised plate formed on the inclined surface of the lower portion. The slide retainer means includes a slide passage extending through the upper portion thereof to communicate with the recess and annular surface.

The device further includes a vertical positioning means fixedly attached to the slide projector and extending through the aperture of the rotatably mounted slide support bracket means.

The device also includes means to rotate the slide support bracket means relative to the slide projector to reorient the slide as more fully described hereinafter.

When operatively assembled, the slide support bracket means and slide retainer means are arranged relative to each other and the vertical positioning means so as to cooperatively engage the slide transparency positioned for viewing. The slide support means is inclined relative to the slide retainer means such that when a slide is fed through the slide passage, the slide will engage and be supported by the interior recess wall.

To operate, a slide is gravity fed through the slide passage to the slide support bracket means where the lower edge of the slide engages the interior recess wall as previously described. When in position, the slide is vertically positioned by the vertical positioning means and annular surface of the slide retaining means. If the slide is not properly oriented relative to the slide projector proper, the slide support bracket means may be rotated manually in 90 degree increments by the rotation means until the slide is in the proper or desired orientation. It should be noted that this reorientation is accomplished without the necessity of removing the slide from the projector itself. After viewing, the slide is removed from the bracket means in proper orientation by a foot which is positioned to engage the bottom of the slide through the rejecting passage and force the slide upward through the slide passage and into the tray. The tray may be then advanced by means commonly known in the art to feed a subsequent slide into the device where the operation is repeated.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description, taken in connection with the accompanying drawings in which:

FIG. 1 is a cross-sectional side view of the present invention.

FIG. 2 is a front view of the slide retainer means.

FIG. 3 is a bottom view of the slide retainer means.

FIG. 4 is a side view of the slide retainer means.

FIG. 5 is a front view of the slide support bracket.

FIG. 6 is an end view of the slide support bracket.

Similar reference characters refer to similar parts throughout the several views of the drawings.

DETAILED DESCRIPTION OF THE PREFERRED EMBODIMENT

As shown in FIG. 1, this invention relates to a slide orienting device, generally indicated as 10, comprising a rotatably mounted slide support bracket means 12 and a fixed slide retainer means 14.

Figure 8:
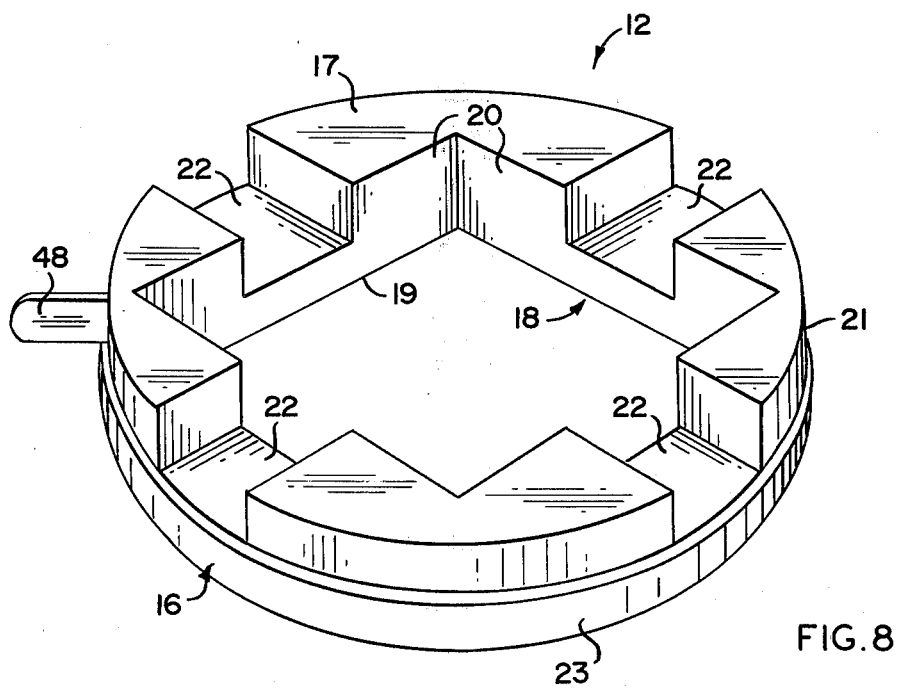
FIG. 8 is a perspective view of the slide support bracket.

As best shown in FIGS. 5 and 8, the bracket means 12 comprises a substantially cylindrically shaped base 16 including top and bottom walls 17 and 19 respectively and peripheral side wall 21. A centrally disposed substantially square aperture 18 extends through the base 16 between top and bottom walls 17 and 19 respectively and peripheral side wall 21. A centrally disposed substantively square aperture 18 extends through the base 16 between top and bottom walls 17 and 19 respectively forming interior recess walls 20. A plurality of spaced rejecting passages 22 extend inwardly from the peripheral side wall 21 to aperture 18 interrupting the upper portion of inner recess walls 20. These passages 22 are spaced equally at 90 degree intervals for reasons more fully described hereinafter. As best seen in FIG. 1, the lower portion of peripheral side wall 21 comprises an enlarged rim 23 which operatively engages substantially annular channel 25 to rotatably mount the flat support bracket 12 to the slide projector.

Figure 7:
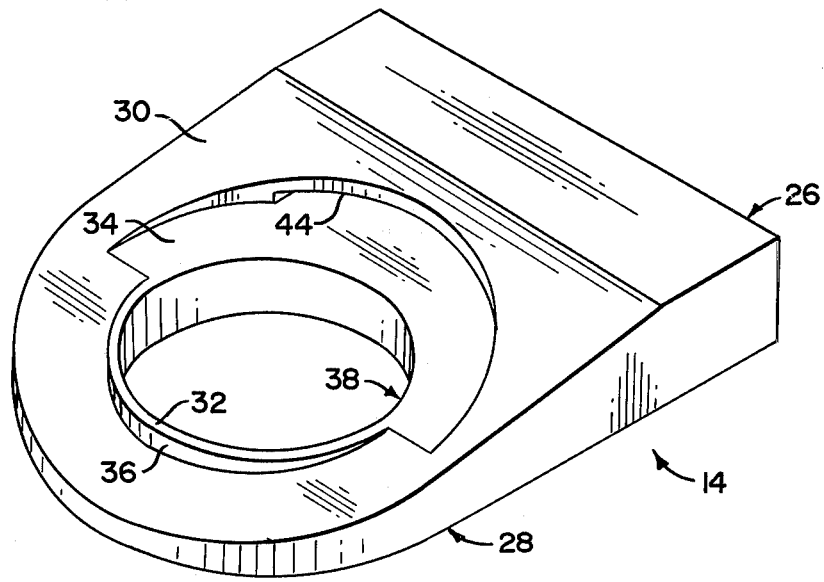
FIG. 7 is a perspective view of the slide retainer means.

As best shown in FIGS. 4 and 7, the slide retainer means 14 comprises an upper substantially rectangular portion 26 and a lower substantially elliptical portion 28 including inclined surface 30. Hemispheric recess 34 and hemispheric raised plate 36 formed on the inclined surface 30 cooperatively form a substantially annular slide retaining surface 32. An aperture 38 is formed in the front surface 40 of the slide retainer means 14 and extends therethrough defined by the inner periphery of annular slide retaining surface 32. The radium of recess 34 is equal to or greater than one-half of the diagonal dimension of the slide A to permit rotation of the slide and slide support bracket 12 as more fully described hereinafter. A slide passage 44 extends through the upper portion 26 to communicate with the recess 34 and the annular surface 32.

As shown in FIG. 1, the device also includes a vertical positioning means comprising at least two hook shaped members 46 fixedly attached to the slide projector and extending forwardly through aperture 18 to engage the rear surface of slide A. When operatively assembled, the slide support bracket means 12 and slide retainer means 14 are arranged relative to each other and vertical positioning means 46 to cooperatively engage the slide transparency A. The bracket means 12 is inclined relative to the retainer means 14 such that when a slide A is fed through slide passage 44, the slide A will engage and be supported by interior recess wall 20. The inclination of bracket means 12 is substantially equal to the inclination of surface 30 on retainer means 14 whereby the bracket means and retainer means operatively engage each other.

The device further includes means to rotate the bracket means 12 relative to the slide projector to reorient slide A. As shown in FIGS. 1 and 5, the rotation means comprises a tab-like member 48 extending outwardly from the peripheral side wall 16. To provide a means of indicating the proper bracket 12 to retainer means 14 orientation resilient L-shaped finger 50 attached to the slide projector proper and circular grooves 52 formed along the center line of passages 22 give a positive indication when the bracket means 12 is on center line.

As best shown in FIG. 1, the slide support bracket means 12 and retainer means 14 are disposed between the projector light source 60 and lens 62 with apertures 18 and 38 actually aligned with the center line therebetween.

To operate, a slide A is gravity fed from a top mounted carrousel or similar type tray (not shown) through slide feed passage 44 to slide support bracket means where the lower edge of slide A engages the interior recess wall 20. Thus in position, slide A is held vertically positioned by vertical positioning members 46 and annular surface 32. If slide A is not properly oriented relative to the slide projector proper, base 16 may be rotated manually in 90 degree increments by tab-like member 48 until the slide A is in the upright position. It should be noted that this reorienting is accomplished without the necessity of removing the slide A from the projector itself. After viewing the slide it it removed from the bracket means 12 in proper orientation by a foot 64 actuated to engage the bottom of the slide A through return slot 22 and force the slide A upward through slide feed passage 44 and into slide holding tray. The tray is then advanced by means commonly known in the art to feed a subsequent slide A into the device, where the operation is repeated.

Although the top loading carrousel-type tray was described, a side or bottom loading tray may also be used. In addition, various automatic rotation means may be employed to orient the slide and support bracket 12.

It will thus be seen that the objects set forth above, among those made apparent from the preceeding description, are efficiently attained, and since certain changes may be made in carrying out the above method and article without departing from the scope of the invention, it is intended that all matter contained in the above description shall be interpreted as illustrative and not in a limiting sense.

It is also to be understood that the following claims are intended to cover all the generic and specific features of the invention herein described, and all statements of the scope of the invention, which, as a matter of language, might be said to fall therebetween.

Now that the invention has been described, what is claimed is:

1. A slide orienting device of the type primarily used with a slide projector, said device comprising: a movably mounted slide support bracket means, a slide retainer means, said slide retainer means and said slide support bracket means cooperatively engaging a slide transparency in viewing alignment with the lens and light source of the slide projector, said slide support bracket means including an aperture formed therein and configured to cooperatively engage in supporting relation thereto at least a portion of the slide transparency such that said transparency is properly oriented for viewing; orienting means to move said slide support bracket means relative to the slide projector to selectively orient the slide transparency, and removal means disposed to remove the slide transparency from said device.

2. The slide orienting device as in claim 1 wherein said removal means includes a plurality of spaced rejecting passages extending from the outer periphery of said slide support bracket means inwardly to said aperture, whereby the rejecting means of the slide projector may operatively pass into the rejecting passageway to engage at least a portion of the slide transparency to force it from the device.

3. The slide orienting device of claim 2 further including an alignment positioning means cooperatively engaging the slide transparency and maintaining it in vertical alignment with the slide projector.

4. The slide orienting device of claim 3 wherein said alignment positioning means comprises at least two hook-like members fixedly attached to the slide projector and extending forwardly through said aperture of said slide support bracket means, said hook-like members positioned to engage the rear surface of the slide transparency thereby retaining it in predetermined position relative to the slide projector.

5. The slide orienting device of claim 1 wherein said orienting means comprises a rotation means for rotating the slide transparency and said slide support bracket means relative to the slide projector to reorient the slide transparency.

6. The slide orienting device of claim 5 wherein said rotation means includes at least one tab formed on said slide support bracket means manually.

7. The slide orienting device of claim 6 wherein said rotation means further includes at least one detent means and corresponding protrusion formed on the slide projection which cooperatively engage each other to positively indicate the position of said slide support bracket means relative to the slide projector.

8. The slide orienting device of claim 1 wherein said aperture comprises a square shape and said slide support bracket means is inclined to the vertical so as to be oriented such that the lower inner side wall of said square aperture is positioned for engagement with said slide.

9. The slide orienting device of claim 8 wherein said slide retainer means comprises a slide retaining surface positioned to operatively engage the slide transparency thereby retaining the slide in viewing the alignment.

10. The slide orienting device of claim 9 wherein said slide retaining surface comprises an annular surface formed by the cooperative relationship of a hemispheric recess and hemispheric raised plate formed in said slide and retaining means, said recess and raised plate being disposed on an inclined surface of said slide retainer means, whereby said slide support bracket means and slide retainer means operatively engage each other.

11. The slide orienting device of claim 9 wherein said slide retainer means further includes a slide passage extending through a portion thereof to communicate with the annular surface.

12. The slide orienting device of claim 9 wherein the radium of said recess is at least as large as one-half the diagonal of the slide transparency whereby rotation of the slide transparency and said slide support bracket means relative to said slide retaining means is permitted.

* * * * *